Dec. 14, 1965 J. D. CATES 3,223,994
DIGITAL-TO-ANALOGUE CONVERTER
Filed Sept. 10, 1962
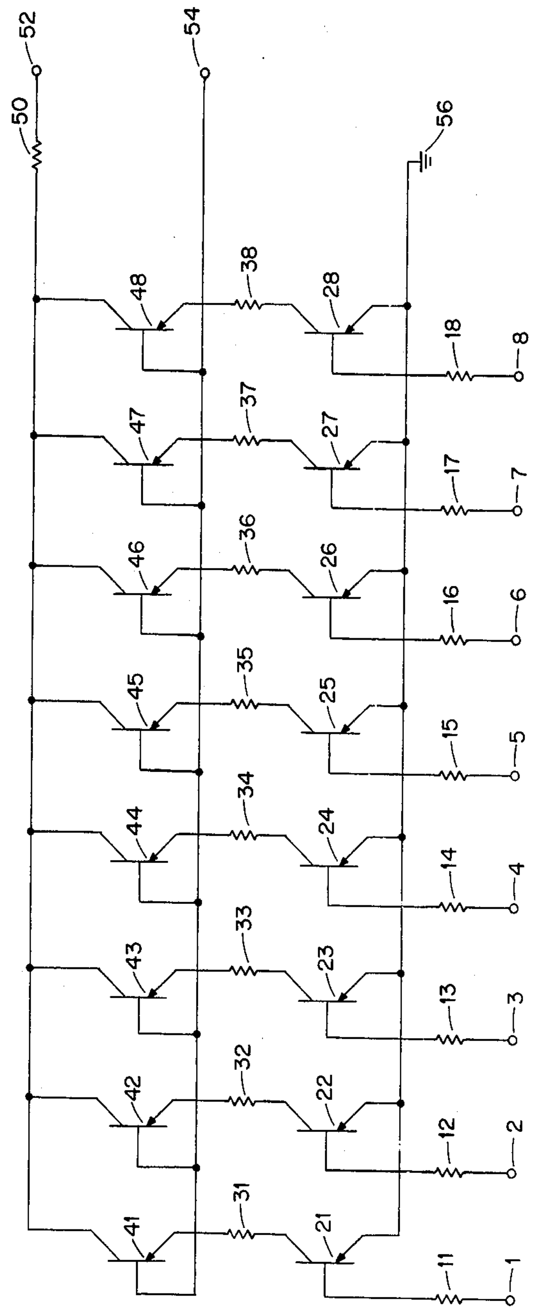
JACKY D. CATES,
INVENTOR.
BY S. J. Rotondi
A. T. Dupont
D. H. Ward 3,223,994
DIGITAL-TO-ANALOGUE CONVERTER
Jacky D. Cates, 5132 Chateau, El Paso, Tex.
Filed Sept. 10, 1962, Ser. No. 222,742
6 Claims. (Cl. 340—347)
(Granted under Title 35, U.S. Code (1952), sec. 266)

The invention described herein may be manufactured and used by or for the Government for governmental purposes without the payment of any royalty thereon.

This invention relates to digital-to-analogue converters and more particularly to a digital-to-analogue converter for producing analogue currents or voltages which are proportional to the magnitude of binary coded decimal numbers.

It has been found that in many applications where digital-to-analogue converters are used that a need exists for small, inexpensive, lightweight converters which can operate at electronic speeds.

It has also been found that a need exists for providing a converter which produces a substantially constant current output at the load even though there may be small variations in the value of the load impedance.

A further need exists for providing a converter which delivers sufficient power to directly drive recording instruments with no degradation of accuracy.

One object of this invention is to provide a digital-to-analogue converter having a number of constant current generators for providing a precise amount of current into the load when a particular generator is turned on by the presence of its respective digital input and supplies no current when this particular generator is turned off.

It is also an object of this invention to provide a digital-to-analogue converter which is capable of operating at electronic speeds.

Another object of this invention is to provide a digital-to-analogue converter which is smaller and lighter than converters of the prior art.

Still another object of this invention is to provide a digital-to-analogue converter which is less expensive to manufacture than converters of the prior art.

It is yet another object of this invention to provide a digital-to-analogue converter which delivers sufficient power to directly drive recording instruments with no degradation of accuracy.

It is still a further object of this invention to provide a digital-to-analogue converter which has substantially no load current change with small variations in the load impedance.

According to the present invention the foregoing and other objects are attained by providing a digital-to-analogue converter which has a plurality of constant current generator circuits connected in parallel. Each circuit has a weighted or proportional resistor connected in series between two P-N-P type transistors, One transistor, which is connected to a digital input, acts as a switch by turning the circuit on in response to a negative input signal and by turning the circuit off in response to a positive input signal. The other transistor, which is connected to the output load, acts as a constant current generator, to provide a precise amount of current into the load. All the circuits operate in a similar manner, except that the current flow in each circuit is determined by the value of the weighted resistor.

The invention will be more fully understood through the following detailed description taken in conjunction with the accompanying drawing wherein the figure is a schematic circuit diagram showing a preferred embodiment of the invention.

Referring to the figure a digital-to-analogue converter is shown consisting of eight parallel circuits or stages. The first stage consists of an input terminal 1, a resistor 11, a P-N-P type transistor 21, another resistor 31 and another P-N-P- type transistor 41. The output of transistor 41 is connected through a common load resistor 50 to output terminal 52. The remaining seven stages have input terminals 2 through 8 respectively which are all connected in parallel with the first stage. Resistors 12 through 18 and transistors 42 through 48 function in the same manner as resistor 11 and transistor 41 respectively. The only difference between the respective stages is in the value of resistors 31 through 38 as will be more fully explained hereinafter.

Referring now more particularly to the first stage, the converter has an input terminal 1 which is connected through a resistor 11 to the base of transistor 21. The emitter of transistor 21 is connected to ground potential 56 while the collector is connected through a proportional resistor 31 to the emitter of transistor 41. The base of transistor 41 is connected to a reference voltage 54 while the collector is connected through a common load resistor 50 to output terminal 52. As shown in the drawing the remaining stages are connected in the same manner as the first stage. In a preferred embodiment of the invention the bases of transistors 21 through 28 are connected respectively to input terminals 1 through 8 to which binary bits representing the respective digits of a decimal number are applied. Transistors 21 through 28 are P-N-P transistors and therefore conduct in a forward direction when the emitter is positive with respect to the base. In this invention a negative-going pulse represents a 1 in the binary system while a positive potential represents a 0.

The operation of the first stage will now be considered. Each of the additional stages are identical in operation except that the load current varies according to the value of the proportional resistors 31 through 38 which increase by a multiple of two. For example, if the value of resistor 31 is 1K ohm, resistor 32 is 2K ohms, resistor 33 is 4K ohms, resistor 34 is 8K ohms, and so forth, up to resistor 38 which, in this example, would be equal to 128K ohms. For purposes of illustration it will be assumed that the voltages at terminals 52 and 54 are negative 8 volts and negative 4 volts respectively. Accordingly, an input signal of negative 4 volts at input terminal 1 will turn the first stage on and a positive 4 volts will turn the stage off. When the input to terminal 1 is a negative 4 volts, transistor 21 (which acts as a switch) is turned on, and its collector to emitter resistance is a minimum or essentially a short circuit from resistor 31 to ground. Transistor 41, which is selected to have unity gain, is connected as an emitter follower (or as a common collector amplifier) and its base is directly connected to a negative 4 volts at terminal 54. Thus, the voltage at the emitter of transistor 41 will be approximately equal to the voltage at terminal 54. The current flowing through resistor 31 is the collector current plus the base current. For the emitter follower connection of transistor 41 the base current will be only a few microamps while the collector current (or load current) will be approximately equal to the emitter current which is determined by the value of resistor 31. Therefore, the current through load resistor 50 will be equal to the value of the voltage at terminal 54 divided by resistor 31 or, in this example, 4 milliamps. The load current will remain at this value through extreme variations in the voltage at terminal 52. Since in each succeeding stage the proportional resistors increase by a multiple of two, the output current of each succeeding stage will be halved. Therefore, the output current of the eighth stage, for example, would have a value of $\frac{1}{32}$ milliamp.

When the voltage applied at terminal 1 (or any of the terminals 2 through 8) is a positive 4 volts with respect to ground, transistor 21 is turned off and the collector-to-emitter resistance of transistor 21 is several megohms.

Thus, the circuit is essentially open when transistor 21 is turned off and there is substantially no current flow through resistor 31. The aforementioned circuit values of resistance and voltage represent values which have been used in the successful operation of this circuit. It should be understood that these values are set forth by way of example only and that the invention is not limited to these values or any of them.

To illustrate the operation of this digital-to-analogue converter let us assume, for example, that the decimal number is 181. This would correspond to an eight digit binary number of 10110101 which would be applied respectively to terminals 1 through 8. Thus, stages one, three, four, six and eight would conduct and the remaining stages would not conduct. Using the resistance and voltage values heretofore given a current of 4 milliamps, 1 milliamp, ½ milliamp, ⅛ milliamp and $\frac{1}{32}$ milliamp would flow out of stages one, three, four, six and eight respectively. This would give an output load current of $\frac{181}{32}$ milliamps which is, of course, directly proportional to the decimal input number 181.

While there have been shown and described and pointed out the fundamental novel features of the invention as applied to a preferred embodiment, it will be understood that various omissions and substitutions and changes in the form and details of this novel circuit illustrated and in its operation may be made by those skilled in the art without departing from the spirit of the invention. It is the intention, therefore, to be limited only as indicated by the scope of the following claims.

The following invention is claimed:

1. A digital-to-analogue converter comprising:
(a) a plurality of parallel-connected circuits;
(b) each of said circuits comprising an input terminal, a switching means, an impedance means and a constant current generating means connected in series;
(c) an output conductor having a load resistor connected thereto;
(d) each of said generating means being connected to said output conductor;
(e) each of said switching means being actuated in response to a digital input representation at each of said input terminals; and
(f) said input representation producing a proportional output analogue representation across said load resistor.

2. A digital-to-analogue converter as set forth in claim 1 wherein:
(a) said switching means is a P-N-P type transistor having a base, emitter and a collector;
(b) said input terminal is connected through an input resistor to the base of said transistor;
(c) the emitter of said transistor is connected to a source of ground potential; and
(d) the emitter of said transistor is connected to said impedance means.

3. A digital-to-analogue converter as set forth in claim 1 wherein:
(a) said impedance means is a resistor; and
(b) the resistance value of each of said resistors is geometrically related by a factor of 2.

4. A digital-to-analogue converter as set forth in claim 1 wherein:
(a) said constant current generating means is a P-N-P type transistor having a base, emitter and a collector, and said transistor supplies a precise amount of current to said load resistor;

(b) the base of said transistor being connected to a first source of negative potential;
(c) the emitter of said transistor being connected to said impedance means; and
(d) the collector of said transistor being connected to said output conductor which in turn is connected to a second source of potential having a value more negative than said first source of negative potential.

5. A digital-to-analogue converter as set forth in claim 4 wherein:
(a) said digit input representation is a negative signal; and
(b) said negative signal having a value equal to that of said first source of negative potential.

6. A digital-to-analogue converter for producing an output load current having a magnitude proportional to a binary coded number represented by binary bit values corresponding to the respective digits of said number comprising:
(a) a plurality of parallel-connected circuits;
(b) each of said circuits comprising an input terminal, a first resistor, a first transistor, a second resistor connected in series, and a second transistor;
(c) an output conductor having a load resistor connected thereto;
(d) said first transistor being a P-N-P type transistor having a base, emitter and collector, said base connected through said first resistor to said input terminal, said emitter connected to a source of ground potential, and said collector connected to said second resistor;
(e) said first transistor being normally nonconducting and operating as a switch such that a negative signal at said input terminal causes it to conduct and a positive signal at said input terminal causes it to remain nonconducting;
(f) said second resistors of each of said plurality of circuits being geometrically related by a factor of two;
(g) said second transistor being a P-N-P type transistor having a base, emitter and collector, the emitter of said second transistor being connected to said second resistor, the base of said second transistor being connected to a first source of negative potential and the collector of said second transistor being connected to said output conductor which in turn is connected to a second source of potential more negative than said first source of negative potential; and
(h) said second transistor having a unity gain and operating as a constant current generator to supply a precise amount of current to said load resistor.

References Cited by the Applicant

UNITED STATES PATENTS

| | | | |
|---|---|---|---|
| 2,970,308 | 1/1961 | Stringfellow et al. | 340—347 |
| 3,019,426 | 1/1962 | Gilbert | 340—347 |
| 3,155,963 | 11/1964 | Boensel | 340—347 |

OTHER REFERENCES

Page 36, June 1959—IBM Technical Disclosure Bulletin, vol. 2, No. 1.

Page 17, December 1960—IBM Technical Disclosure Bulletin vol. 3, No. 7.

MALCOLM A. MORRISON, *Primary Examiner.*